(No Model.) 2 Sheets—Sheet 1.
T. C. CHAPPELL.
CONDUIT PROVIDED WITH CONDUIT COUPLINGS.
No. 509,567. Patented Nov. 28, 1893.
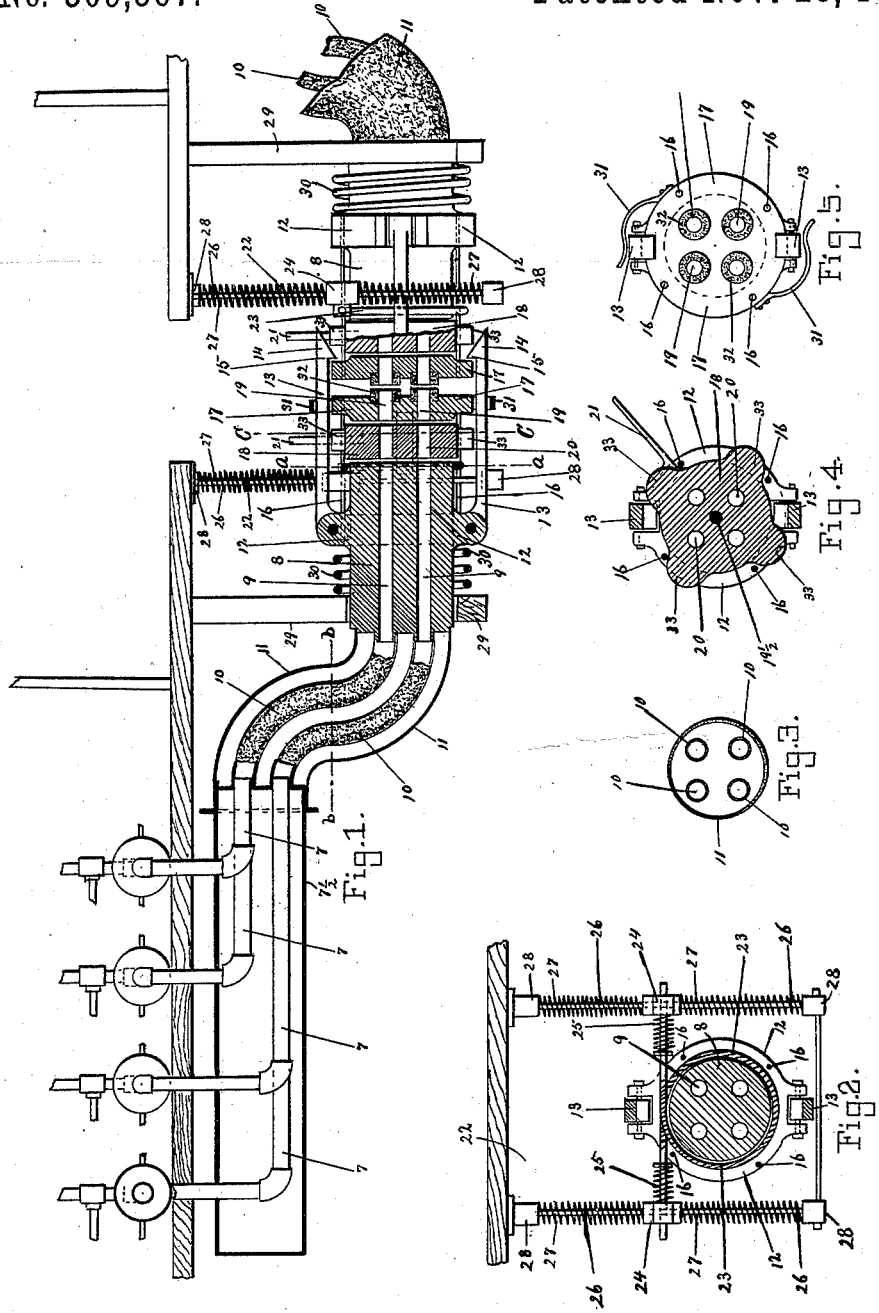
Witnesses
W. L. Bailie.
P. Schaefer
Inventor
Thomas C. Chappell (No Model.) 2 Sheets—Sheet 2.
T. C. CHAPPELL.
CONDUIT PROVIDED WITH CONDUIT COUPLINGS.
No. 509,567. Patented Nov. 28, 1893.
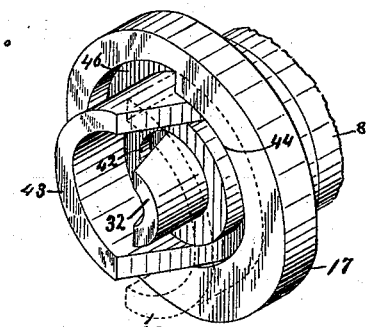
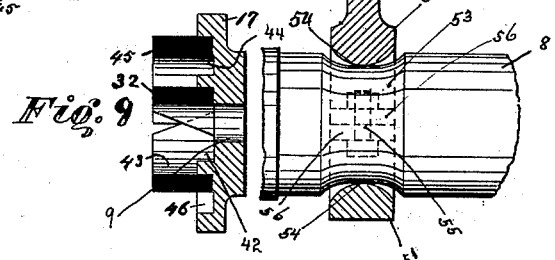
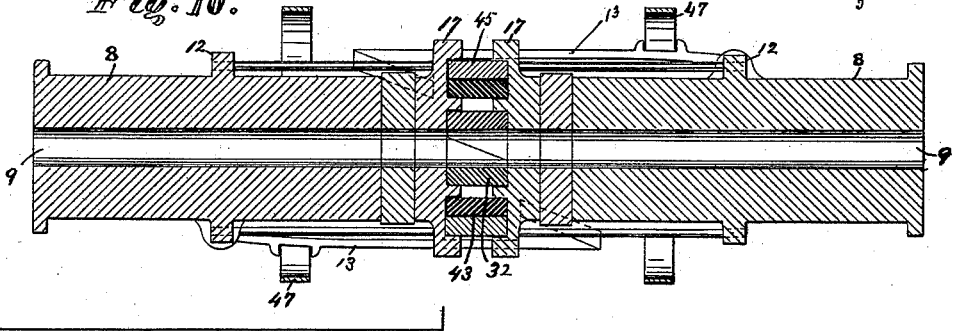
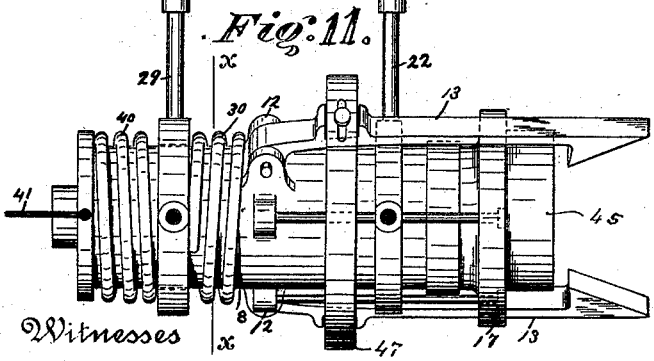
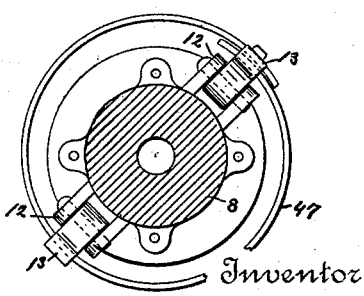
Witnesses
Edward A. Osse,
Wm L. Bailie.
Inventor
Thos. C. Chappell
THE NATIONAL LITHOGRAPHING COMPANY,
WASHINGTON, D. C.

UNITED STATES PATENT OFFICE.

THOMAS C. CHAPPELL, OF BALTIMORE, MARYLAND.

CONDUIT PROVIDED WITH CONDUIT-COUPLINGS.

SPECIFICATION forming part of Letters Patent No. 509,567, dated November 28, 1893.

Application filed March 5, 1888. Serial No. 266,155. (No model.)

*To all whom it may concern:*

Be it known that I, THOMAS C. CHAPPELL, a citizen of the United States, residing at Baltimore, in the State of Maryland, have invented certain new and useful Improvements in Conduits Provided with Conduit-Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to conduits and improvement in their couplings wherein I provide in the coupling one or more conduits for the passage therethrough of any fluids, and may be used on railroad trains where one or several lines of piping are required to pass through the train; by the use of this device one coupling may serve to make a joint for all the pipes.

The coupling may be so constructed that it will automatically lock itself to the coupling of another car and a suitable cut-off is provided for closing the said conduits through the coupling preferably, and a multiple cut off is provided for the conduits and the coupling, and said conduits may be insulated and protected; said couplings may at the same time serve as the ordinary connection for cars by attaching the draft rod.

In the further description of my invention reference is had to the accompanying drawings, in which—

Figure 1. is a side elevation of a pair of the couplings, showing them locked together; one coupling in section, the other in full, with a part of the locking arm removed. Fig. 2. is a cross sectional view taken through A—A of the device shown in Fig. 1., showing the manner in which the coupling may be suspended under car. Fig. 3. is a cross sectional view through the device shown in Fig. 1 at b—b in the flexible tubing thereof. Fig. 4. is a cross sectional view through the cut-off at c—c. of the device shown in Fig. 1. Fig. 5. is a view looking on the end of the device shown in Fig. 1., in which elastic cushion or insulator circle is not shown. Fig. 6. is an end view showing section or line x—x Fig. 11., showing the locking arms placed at an angle of forty-five degrees from a vertical plane. Fig. 7. shows a perspective view of the end of the coupling in detail. Fig. 8. is a detailed view of the end of coupling with the elastic ring, the insulating ring and the metallic extension and the recesses shown in section. Fig. 9. is a detailed portion of the opposite of the devices represented in Fig. 8. Fig. 10. is a horizontal section of a pair of couplings complete. Fig. 11. is a side elevation in full of one coupling showing extra buffer and draft rod attached. Fig. 12 is a side view of supporting device in modification in section showing swell and groove.

The same figures refer to same or similar parts throughout the several views.

The figure 8 denotes the body of the coupling, which may be constructed of metal and has extending therethrough the openings 9., the number of these openings corresponding to the number of pipes 7., which are to be connected to the coupling preferably by means of the flexible tubes 10., whereby flexibility is permitted the conduits at this point. An outer flexible envelope 11., may serve to inclose all the tubes 10; one end of the said envelope 11., being secured to the end of a casing 7½ in which all the pipes can be placed for protection thereto and for insulation, the other end of the envelope 11 being secured to the body of the coupling as shown in Fig. 1.

The coupling may be supported by a band 51 shown in modification in Fig. 12 which is preferably provided with a swell 54 loosely engaging in a groove 53 which may be constructed in the body 8 of the coupling and by which universal transverse motion may be permitted. Said band is preferably made in sections and bolted together by the bolt or screw 55 through the flange 56. The band may be attached to the car by providing the male end 52 with a thread and engaging it in a female attached to platform of the car or by any other well known means.

One or more car conduits may be supported in the incasing insulating conduit 7½ by a perforated diaphragm plate. The flexible conduits 10 may be likewise supported in flexible incasing conduit 11. Encircling the body 8 is the collar or offset 12 which has pivoted thereto the locking arms 13, the said arms terminating in the tapered end 14 and the offset 15 thereon for locking to the coupling of another car, in a manner to be herein described. Connected to the body 8 by means of preferably the rod 16 one end of which is secured to the collar 12 is the end 17 of the coupling, it being made preferably of a separate piece from the body 8, and provided with the openings 19 therethrough in line with the openings in the said body 8. Placed between the said body and end may be the cut off 18 which is free to rotate on its pivot 19½ by means of the handle 21 thereon, the said cutoff being provided with the openings 20 therethrough corresponding with the openings in the body 8 and the end 17 and by the rotating movement of the said cut-off the openings thereof be thrown in or out of register with the said openings in the body 8 and flanged end 17 and thus close or open the communication at this point when desired.

When the coupling is employed on a car it is preferably suspended under the platform thereof by means of the vibrating support 22 which is constructed as represented in Fig. 2., wherein is the strap 23 encircling loosely the coupling, the ends of which project through and are free to move in the bearings 24, the spring 25 being placed one on either side of the said strap 23 and serving to hold the coupling in the central position. Secured to the car are the rods 26 upon which slides the bearing pieces 24, a spring 27 being placed upon each side of the said bearing 24 by which the proper position of the coupling is maintained in this plane, suitable backings 28 being provided for the said springs, whereby the coupling may yield to a strain in any direction and normally be in proper position for coupling automatically to another car; but I do not claim this device in this application as said device is fully covered by the claims in my Patent No. 398,702.

In order to form a proper backing for the coupling a beam 29 may be extended from the car having an opening therein through which is free to move the coupling, a buffer spring 30 being placed between the said beam 29 and the collar 12 as shown in Fig. 1. A similar buffer 40 may be placed between the beam and the end of said coupling that connects to the flexible section. In order to hold the locking arms 13 in the closed position there may be provided preferably on the flange 17 the springs 31 the free ends of which bear on top of the said arms 13 as shown in Fig. 5., whereby when the coupling is brought in contact with the coupling of another car the end of said coupling will cause the said arms 13 to be raised by the tapered end 14 thereof until the offset 15 passes the inner edge of said flanged end 17 or engages some similar offset when the spring 31 will cause the said arms 13 to drop and the two couplings will be securely locked together, (an adjustable band 47 may be used instead of springs as a modification thereof,) the openings 9 through both couplings made continuous, and the joint between the two couplings made air tight by means of the elastic rings 32 which terminate the openings 19 in the flanged end 17 and project sufficiently therefrom to render this joint air tight by the elasticity thereof when the said two couplings are held together by the locking arms 13.

Provision is made for tripping the arms 13 and thus permitting the couplings to be separated, by the projecting ears 33 with which the cutoff 18 may be provided Fig. 4, whereby when the openings 20 of the said cutoff are thrown out of register with the openings in the other parts of the coupling, the projecting ears 33 will be brought in contact with the under side of the arms 13 and cause the said arms to be raised sufficient to clear the offset 15 thereof from the flanged end 17 of the other coupling. The rods 16 which may be so distributed around the coupling, that in addition to holding the parts of the coupling together they will likewise serve as a stop in the movement of the said cutoff 18 which as previously stated, is provided with a handle 21 for convenience of operating or said handle may operate in a ratchet. The elastic ring 32, may be placed partly upon one coupling and partly upon another as shown in Figs. 7, 8, 9 and 10, and engage each other at an angle and thus form a more air tight joint. I preferably place an insulating ring or conduit 43, Figs. 7, 8, 9 and 10, around said ring, said insulating ring being preferably rubber and placed partly upon one coupling and partly upon another, so that when two couplings are joined, a complete insulating envelope or insulating circle is formed, and I preferably provide a recess engaging the same preferably at an oblique angle in each coupling to receive said one or more rings 32, and a recess 44, for the insulating ring 43, and I preferably place upon each coupling a metallic projection 45, which will engage with a similar projection upon a corresponding coupling covering the crevice formed by the insulating rings except at one point, making the connection more air tight, and said metallic extensions may engage with a recess 46, in the opposite coupling and thus prevent transverse motion and relieve the springs of the locking arms of all transverse strain.

The metallic projection 45 may be integral with plate 17—or it may be of any other suitable similar material and may be attached to plate 17 by screws or in any well known way.

I preferably construct each coupling so that it will be a counterpart of every other coupling. When one locking arm is employed, I preferably bring it on one and the same side of each coupling so that it moves in a horizontal plane parallel with the axis of the coupling. When two locking arms are employed on each coupling I preferably place them at an angle of ninety degrees from each other. The coupling is thus made universal and the conduit of one car may be connected to that of another car irrespective of whichever end may be brought together and coupled. The draft rod of the train 41 shown in Fig. 11 may be connected to the coupling employed for conveying fluids and this one coupling made to serve the combined purposes of drawing the train and conveying fluids.

In order to heat each car by a separate pipe and at the same time to permit each car to occupy any position on the train and to be changed from any one position therein to any other at will, I extend throughout the train several conduits and connect each of said conduits to each of said cars by branch conduits and place a shut-off valve or stop-cock in each of said branch conduits, so that any one of the several conduits which extend from one end to the other of each car can be utilized for heating said car. This arrangement enables me to couple a number of cars together indiscriminately and by connecting the various conduits beneath the several cars with one another, I can obtain with any arrangement of cars a set of independent conduits each leading from the furnace car to each separate car of the train.

Having described my invention and the manner of operating, what I claim, and desire to secure by United States Letters Patent, is—

1. In a conduit for the transmission of fluids of a railroad train the combination of a rigid conduit through which there are several continuous passage ways, with a rubber or similar flexible conduit connected thereto, in which there are a similar number of passage ways, which are connected to and from continuations of those in the rigid conduit, and a conduit coupling connected to the flexible section which is also provided with passages of the same size and number of those of the flexible section and which register with them.

2. In a conduit for the transmission of fluids on a railroad car, a conduit extending from one end to the other of the car and provided on each end with a section of a coupling, which has a locking arm or arms on each section of the coupling, and offset or inset upon each section suitably located to engage the locking arm or arms of another coupling when the two parts are brought together, and a shut-off device consisting of a plate or section thereof, perforated with a hole or holes registering with the passage way or ways of the conduit, and mounted in such a manner upon the coupling, that when it is operated its holes will be thrown out of register with the passages and close them, said plate being also provided with cams or lugs or inclined planes upon it in such a position, as to bear upon the under side of the locking arms of the coupling and unlock them when operated and at the same time close the passages of the conduit.

3. In a conduit for the transmission of fluids a conduit provided with a coupling having a section of an elastic ring located on the contact surface thereof substantially as shown and described and for the purpose set forth.

4. In a conduit for the transmission of fluids, a conduit provided with a coupling having an end plate provided with a section of a metallic ring on the contact surface thereof constructed substantially as shown and described and for the purpose set forth.

5. In a conduit for railroad cars a conduit provided with a coupling the contact surfaces of the two halves of which are provided with rings or cylinders surrounding the conduit, the ends of which are inclined, each cut by a plane at the same oblique angle with the axis of the cylinder and so located in relation to one another that when the halves of the coupling are brought together the inclined ends of the rings or cylinders will coincide substantially as described.

6. In a conduit for railroad cars a conduit, in combination with a conduit coupling consisting of two halves each of which is provided with locking arm or arms and perforated by a conduit, the conduits of the two parts registering with one another, in combination with a plate suitably journaled in said coupling and provided with a hole which registers with the coupling conduit and having on its edge cams or lugs, so located as to engage the under side of the locking arm whereby when the plate is turned, the conduit may be closed, at the same time that the coupling is unlocked, substantially as described.

7. In a conduit for the transmission of fluids on a railroad car, several main conduits incased in a main air tight incasing conduit and having several flexible conduits made of rubber or similar material incased in a flexible incasing conduit, connected to the main incasing conduit and provided with a multiple conduit coupling as shown and described.

8. In a conduit for railroad cars a conduit, in combination with a conduit coupling, the contact surfaces of each half of which are provided with an oblique section of one or more rings or cylinders, of any suitable material, the two parts of each complete ring or cylinder being secured, one to one half of the coupling and the other to the other half of the coupling, in such location that when the two halves of the coupling are brought together the two parts of each cylinder or ring will unite and form a complete ring or cylinder surrounding the conduit or conduits substantially as described.

9. In a conduit for railroad cars a conduit, in combination with a conduit coupling, the contact surfaces of each half of which are provided with oblique sections of two or more rings or cylinders of elastic material, the two parts of each ring or cylinder being secured one to one half of the coupling and the other to the other half of the coupling, in such location as to nest with the sections on the opposite coupling and when the two halves of the coupling are brought together the two parts of each ring or cylinder will unite and form a complete ring or cylinder surrounding the conduit or conduits, substantially as described.

10. In a conduit for railroad cars, a conduit, in combination with a conduit coupling the contact surfaces of each half of which are provided with oblique sections of two or more rings or cylinders, the oblique plane of section of each cylinder being at an oblique angle with the axis of the cylinder and coupling, and on the opposite side of said axis from the plane of section of its adjacent cylinder, said sections nesting with one another and being so located that when the two halves of the coupling are brought together the two parts of each cylinder or ring will unite and form a complete ring or cylinder surrounding the conduit or conduits, substantially as described.

11. In a conduit for railroad cars, a conduit, in combination with a conduit coupling the contact faces of each half of which are provided with oblique sections of cylinders, one-half of each cylinder being secured to one half of the coupling said cylinders being concentric with the coupling and cut into two parts by a vertical oblique plane, so that when the couplings of this kind are placed upon the ends of a railroad car, the couplings may all be made exactly alike and however the cars may be coupled up, two corresponding couplings each containing a similar part of the cylinder will come together and make a complete union of the coupling.

12. In a conduit for railroad cars, a conduit, in combination with a conduit coupling the contact faces of the two halves of which are provided with a gasket, constructed of one or more concentric rings or cylinders of flexible material, the bases of which are set into one or more concentric grooves in the faces of the coupling, said cylinders being each cut into two parts by a vertical oblique plane and the two parts of each cylinder being secured to one half of the coupling in such relative position that when the two parts of the coupling are united each cylinder will be complete and will rest in its respective grooves in the faces of the coupling, substantially as described.

13. In a conduit for a railroad car, a conduit, in combination with a conduit coupling the contact faces of the two halves of which are provided with a gasket, constructed with one or more rings or cylinders of elastic material, the bases of which are set into one or more concentric grooves in the faces of the coupling, said cylinders being each cut into two parts by a vertical oblique plane, the planes cutting adjacent cylinders being at an angle with one another and about equally inclined to the axis of the coupling of the opposite sides thereof, the two parts of each cylinder being secured to one-half of the coupling in such a relative position that when the two parts of the coupling are united each cylinder will be complete and will rest in its respective grooves in the faces of the coupling, substantially as described.

14. In a conduit for railroad cars a conduit provided with a coupling, the contact surfaces of the two halves of which are provided with rings or cylinders surrounding the conduit, the ends of which are inclined, each cut by a plane at the same oblique angle with the axis of the cylinder and so located in relation to one another that when the halves of the coupling are brought together the inclined ends of the rings or cylinders will coincide, said coupling being connected to the draft mechanism of the car and whereby the car is drawn.

In testimony whereof I affix my signature in presence of two witnesses.

THOS. C. CHAPPELL.

Witnesses:
   JNO. T. MADDOX,
   WM. SCHAEFER.